US010298049B2

(12) United States Patent
Widmer et al.

(10) Patent No.: US 10,298,049 B2
(45) Date of Patent: May 21, 2019

(54) SYSTEMS, METHODS, AND APPARATUS FOR DETECTING METALLIC OBJECTS IN A PREDETERMINED SPACE VIA INDUCTIVE KINEMATIC SENSING

(71) Applicant: WiTricity Corporation, Watertown, MA (US)

(72) Inventors: Hans Peter Widmer, Wohlenschwil (CH); Andreas Daetwyler, Unterentfelden (CH); Lukas Sieber, Olten (CH)

(73) Assignee: WiTricity Corporation, Watertown, MA (US)

( * ) Notice: Subject to any disclaimer, the term of this patent is extended or adjusted under 35 U.S.C. 154(b) by 578 days.

(21) Appl. No.: 15/040,721

(22) Filed: Feb. 10, 2016

(65) Prior Publication Data

US 2017/0097437 A1 Apr. 6, 2017

Related U.S. Application Data

(60) Provisional application No. 62/237,323, filed on Oct. 5, 2015.

(51) Int. Cl.
*H02J 7/02* (2016.01)
*H02J 50/60* (2016.01)
(Continued)

(52) U.S. Cl.
CPC ............ *H02J 7/025* (2013.01); *B60L 11/182* (2013.01); *G01V 3/101* (2013.01); *H02J 50/12* (2016.02);
(Continued)

(58) Field of Classification Search
USPC .............................. 324/222, 227, 234, 207.16
See application file for complete search history.

(56) References Cited

U.S. PATENT DOCUMENTS

2010/0084918 A1* 4/2010 Fells ................. H02J 5/005
307/32
2011/0029156 A1 2/2011 Vernacchia et al.
(Continued)

FOREIGN PATENT DOCUMENTS

WO WO-2011006758 A2 1/2011
WO WO-2012173128 A1 12/2012
(Continued)

OTHER PUBLICATIONS

International Search Report and Written Opinion—PCT/US2016/050984—ISA/EPO—dated Nov. 22, 2016.

*Primary Examiner* — Vincent Q Nguyen
(74) *Attorney, Agent, or Firm* — Knobbe, Martens, Olson & Bear, LLP

(57) ABSTRACT

An apparatus for detecting a presence of an object is provided. The apparatus includes an inductive sensing coil that is configurable to generate a magnetic field, the inductive sensing coil configured to have an electrical characteristic that is detectable when generating the magnetic field. The apparatus includes an actuator configured to inducing relative motion between the inductive sensing coil and the object while the inductive sensing coil generates the magnetic field. The apparatus includes a controller configured to detect a change in the electrical characteristic, and determine a presence of the object based on the change in the electrical characteristic correlating with the relative motion between the inductive sensing coil and the object. The electrical characteristic includes one or more of an equivalent resistance, an equivalent inductance, an equivalent impedance, and an impulse response of the inductive sensing coil.

30 Claims, 8 Drawing Sheets

(51) Int. Cl.
  *H02J 50/12*   (2016.01)
  *B60L 11/18*   (2006.01)
  *G01V 3/10*    (2006.01)
  *H04B 5/00*    (2006.01)
  *H02J 50/80*   (2016.01)
  *G01D 5/20*    (2006.01)
  *H01F 38/14*   (2006.01)

(52) U.S. Cl.
  CPC .............. *H02J 50/60* (2016.02); *H02J 50/80* (2016.02); *H04B 5/0037* (2013.01); *H04B 5/0043* (2013.01); *B60L 2270/147* (2013.01); *G01D 5/2006* (2013.01); *H01F 38/14* (2013.01); *Y02T 10/7005* (2013.01); *Y02T 10/7072* (2013.01); *Y02T 90/122* (2013.01); *Y02T 90/14* (2013.01)

(56) References Cited

U.S. PATENT DOCUMENTS

| | | |
|---|---|---|
| 2011/0128015 A1 | 6/2011 | Dorairaj et al. |
| 2012/0119576 A1 | 5/2012 | Kesler et al. |
| 2012/0187757 A1 | 7/2012 | Wechlin et al. |
| 2013/0249299 A1 | 9/2013 | Shijo et al. |
| 2014/0084857 A1 | 3/2014 | Liu et al. |
| 2014/0167704 A1 | 6/2014 | Lafontaine et al. |
| 2016/0187519 A1 | 6/2016 | Widmer et al. |

FOREIGN PATENT DOCUMENTS

| | | |
|---|---|---|
| WO | WO-2013127445 A1 | 9/2013 |
| WO | WO-2014041176 A2 | 3/2014 |
| WO | WO-2015128498 A1 | 9/2015 |
| WO | WO-2015129143 A1 | 9/2015 |

\* cited by examiner

SYSTEMS, METHODS, AND APPARATUS FOR DETECTING METALLIC OBJECTS IN A PREDETERMINED SPACE VIA INDUCTIVE KINEMATIC SENSING

CLAIM OF PRIORITY UNDER 35 U.S.C. § 119

The present application for patent claims priority to Provisional Application No. 62/237,323 entitled "SYSTEMS, METHODS, AND APPARATUS FOR DETECTING METALLIC OBJECTS IN A PREDETERMINED SPACE VIA INDUCTIVE KINEMATIC SENSING" filed Oct. 5, 2015, and assigned to the assignee hereof. Provisional Application No. 62/237,323 is hereby expressly incorporated by reference herein.

FIELD

The present disclosure relates generally to wireless power transfer, and more specifically to systems, methods and apparatuses for detecting metallic objects in a predetermined space via inductive kinematic sensing.

BACKGROUND

Remote systems, such as vehicles, have been introduced that include locomotion power derived from electricity received from an energy storage device such as a battery. Such energy storage devices need to be periodically charged. For example, hybrid electric vehicles include on-board chargers that use power from vehicle braking and traditional motors to charge the vehicles. Battery electric vehicles (electric vehicles) are often proposed to be charged through some type of wired alternating current (AC) such as household or commercial AC supply sources. The wired charging connections require cables or other similar connectors that are physically connected to a power supply. Cables and similar connectors may sometimes be inconvenient or cumbersome and have other drawbacks. Wireless charging systems that are capable of transferring power in free space (e.g., via an electromagnetic field) to be used to charge electric vehicles may overcome some of the deficiencies of wired charging solutions. However, using electromagnetic fields may induce eddy currents in a well conducting (e.g., metallic or metallic) object located within the field, potentially causing the object to heat up, vibrate or cause a nearby object to melt or catch fire. As such, wireless charging systems and methods that efficiently and safely transfer power for charging electric vehicles are desirable.

SUMMARY

One aspect of the disclosure provides an apparatus for detecting an object. The apparatus comprises an inductive sensing coil that is configurable to generate a first magnetic field, the inductive sensing coil configured to have an electrical characteristic that is detectable when generating the first magnetic field. The apparatus comprises an actuator configured to induce relative motion between the inductive sensing coil and the object while the inductive sensing coil generates the first magnetic field. The apparatus comprises a controller configured to detect a change in the electrical characteristic, and determine a presence of the object based on the change in the electrical characteristic correlating with the relative motion between the inductive sensing coil and the object.

Another aspect of the disclosure provides an implementation of a method for detecting a presence of an object. The method comprises generating a first magnetic field via an inductive sensing coil configured to have an electrical characteristic that is detectable when generating the first magnetic field. The method further comprises inducing relative motion between the inductive sensing coil and the object while the inductive sensing coil generates the first magnetic field. The method further comprises detecting a change in the electrical characteristic. The method further comprises determining a presence of the object based on the change in the electrical characteristic correlating with the relative motion between the inductive sensing coil and the object.

Yet another aspect of the disclosure provides a non-transitory, computer-readable medium comprising code that, when executed, causes an apparatus for detecting an object to generate a first magnetic field via an inductive sensing coil configured to have an electrical characteristic that is detectable when generating the first magnetic field. The code, when executed, further causes the apparatus to induce relative motion between the inductive sensing coil and the object while the inductive sensing coil generates the first magnetic field. The code, when executed, further causes the apparatus to detect a change in the electrical characteristic. The code, when executed, further causes the apparatus to determine a presence of the object based on the change in the electrical characteristic correlating with the relative motion between the inductive sensing coil and the object.

Yet another aspect of the disclosure provides an apparatus for detecting a presence of an object. The apparatus comprises means for generating a first magnetic field, the means for generating the first magnetic field configured to have an electrical characteristic that is detectable when generating the first magnetic field. The apparatus further comprises means for inducing relative motion between the means for generating the first magnetic field and the object while generating the first magnetic field. The apparatus further comprises means for detecting a change in the electrical characteristic. The apparatus further comprises means for determining a presence of the object based on the change in the electrical characteristic correlating with the relative motion between the means for generating the first magnetic field and the object.

Figure 1:
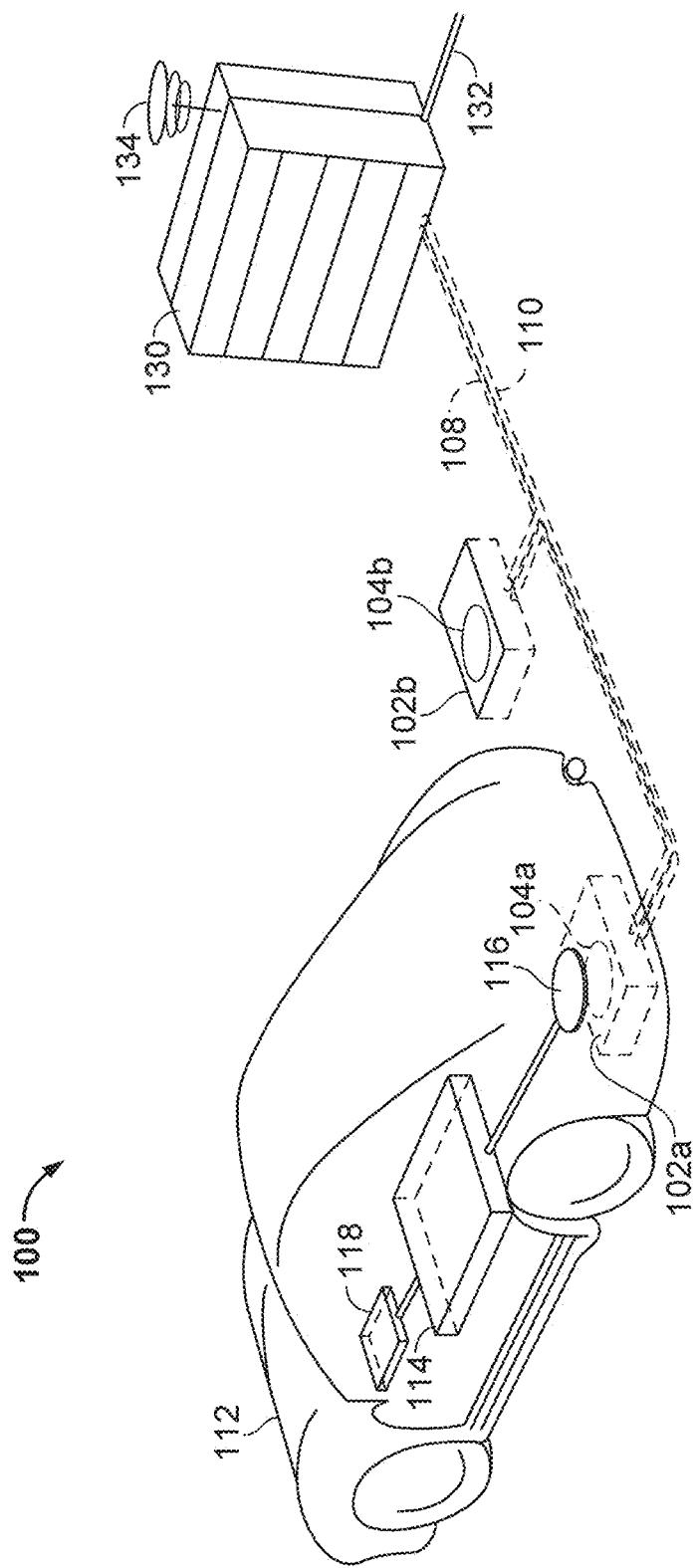
FIG. 1 is a diagram of a wireless power transfer system for charging an electric vehicle, in accordance with some implementations.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is intended as a description of implementations and is not intended to represent the only implementations in which the invention may be practiced. The term "exemplary" used throughout this description means "serving as an example, instance, or illustration," and should not necessarily be construed as preferred or advantageous over other implementations. The detailed description includes specific details for the purpose of providing a thorough understanding of the implementations. In some instances, some devices are shown in block diagram form.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into an electro-magnetic field (e.g., a magnetic field) may be received, captured by, or coupled by a "receiving coupler" to achieve power transfer.

An electric vehicle is used herein to describe a remote system, an example of which is a vehicle that includes, as part of its locomotion capabilities, electrical power derived from a chargeable energy storage device (e.g., one or more rechargeable electrochemical cells or other type of battery). As non-limiting examples, some electric vehicles may be hybrid electric vehicles that include besides electric motors, a traditional combustion engine for direct locomotion or to charge the vehicle's battery. Other electric vehicles may draw all locomotion ability from electrical power. An electric vehicle is not limited to an automobile and may include motorcycles, carts, scooters, and the like. By way of example and not limitation, a remote system is described herein in the form of an electric vehicle (EV). Furthermore, other remote systems that may be at least partially powered using a chargeable energy storage device are also contemplated (e.g., electronic devices such as personal computing devices and the like).

FIG. 1 is a diagram of a wireless power transfer system 100 for charging an electric vehicle 112, in accordance with some implementations. The wireless power transfer system 100 enables charging of an electric vehicle 112 while the electric vehicle 112 is parked near a base wireless charging system 102a. Spaces for two electric vehicles are illustrated in a parking area to be parked over corresponding base wireless charging system 102a and 102b. In some implementations, a local distribution center 130 may be connected to a power backbone 132 and configured to provide an alternating current (AC) or a direct current (DC) supply through a power link 110 to the base wireless charging system 102a. The base wireless charging system 102a also includes a base coupler 104a for wirelessly transferring or receiving power. An electric vehicle 112 may include a battery unit 118, an electric vehicle coupler 116, and an electric vehicle wireless charging system 114. Each of the base wireless charging systems 102a and 102b also includes a base coupler 104a and 104b, respectively, for wirelessly transferring power. In some other implementations (not shown in FIG. 1), base couplers 104a or 104b may be stand-alone physical units and are not part of the base wireless charging system 102a or 102b. The electric vehicle coupler 116 may interact with the base coupler 104a for example, via a region of the electromagnetic field generated by the base coupler 104a.

In some implementations, the electric vehicle coupler 116 may receive power when the electric vehicle coupler 116 is located in an energy field produced by the base coupler 104a. The field corresponds to a region where energy output by the base coupler 104a may be captured by an electric vehicle coupler 116. For example, the energy output by the base coupler 104a may be at a level sufficient to charge or power the electric vehicle 112. In some cases, the field may correspond to the "near field" of the base coupler 104a. The near-field may correspond to a region in which there are strong reactive fields resulting from the currents and charges in the base coupler 104a that do not radiate power away from the base coupler 104a. In some cases the near-field may correspond to a region that is within about $1/2\pi$ of wavelength of the base coupler 104a (and vice versa for the electric vehicle coupler 116) as will be further described below.

Local distribution 130 may be configured to communicate with external sources (e.g., a power grid) via a communication backhaul 134, and with the base wireless charging system 102a via a communication link 108.

In some implementations the electric vehicle coupler 116 may be aligned with the base coupler 104a and, therefore, disposed within a near-field region simply by the driver positioning the electric vehicle 112 correctly relative to the base coupler 104a. In other implementations, the driver may be given visual, auditory, or tactile feedback, or combinations thereof to determine when the electric vehicle 112 is properly placed for wireless power transfer. In yet other implementations, the electric vehicle 112 may be positioned by an autopilot system, which may move the electric vehicle 112 back and forth (e.g., in zig-zag movements) until an alignment error has reached a tolerable value. This may be performed automatically and autonomously by the electric vehicle 112 without or with only minimal driver intervention provided that the electric vehicle 112 is equipped with a servo steering wheel, ultrasonic sensors, and intelligence to adjust the vehicle. In still other implementations, the electric vehicle coupler 116, the base coupler 104a, or a combination thereof may have functionality for displacing and moving the couplers 116 and 104a relative to each other to more accurately orient them and develop more efficient coupling therebetween.

The base wireless charging system 102a may be located in a variety of locations. As non-limiting examples, some suitable locations include a parking area at a home of the electric vehicle 112 owner, parking areas reserved for electric vehicle wireless charging modeled after conventional petroleum-based filling stations, and parking lots at other locations such as shopping centers and places of employment.

Charging electric vehicles wirelessly may provide numerous benefits. For example, charging may be performed automatically, virtually without driver intervention and manipulations thereby improving convenience to a user. There may also be no exposed electrical contacts and no mechanical wear out, thereby improving reliability of the wireless power transfer system 100. Manipulations with cables and connectors may not be needed, and there may be no cables, plugs, or sockets that may be exposed to moisture and water in an outdoor environment, thereby improving safety. There may also be no sockets, cables, and plugs visible or accessible, thereby reducing potential vandalism of power charging devices. Further, since an electric vehicle 112 may be used as distributed storage devices to stabilize a power grid, a docking-to-grid solution may be used to increase availability of vehicles for Vehicle-to-Grid (V2G) operation.

A wireless power transfer system 100 as described with reference to FIG. 1 may also provide aesthetic and non-impedimental advantages. For example, there may be no charge columns and cables that may be impedimental for vehicles and/or pedestrians.

As a further explanation of the vehicle-to-grid capability, the wireless power transmit and receive capabilities may be configured to be reciprocal such that the base wireless charging system 102a transfers power to the electric vehicle 112 and the electric vehicle 112 transfers power to the base wireless charging system 102a, e.g., in times of energy shortfall. This capability may be useful to stabilize the power distribution grid by allowing electric vehicles to contribute power to the overall distribution system in times of energy shortfall caused by over demand or shortfall in renewable energy production (e.g., wind or solar).

Figure 2:
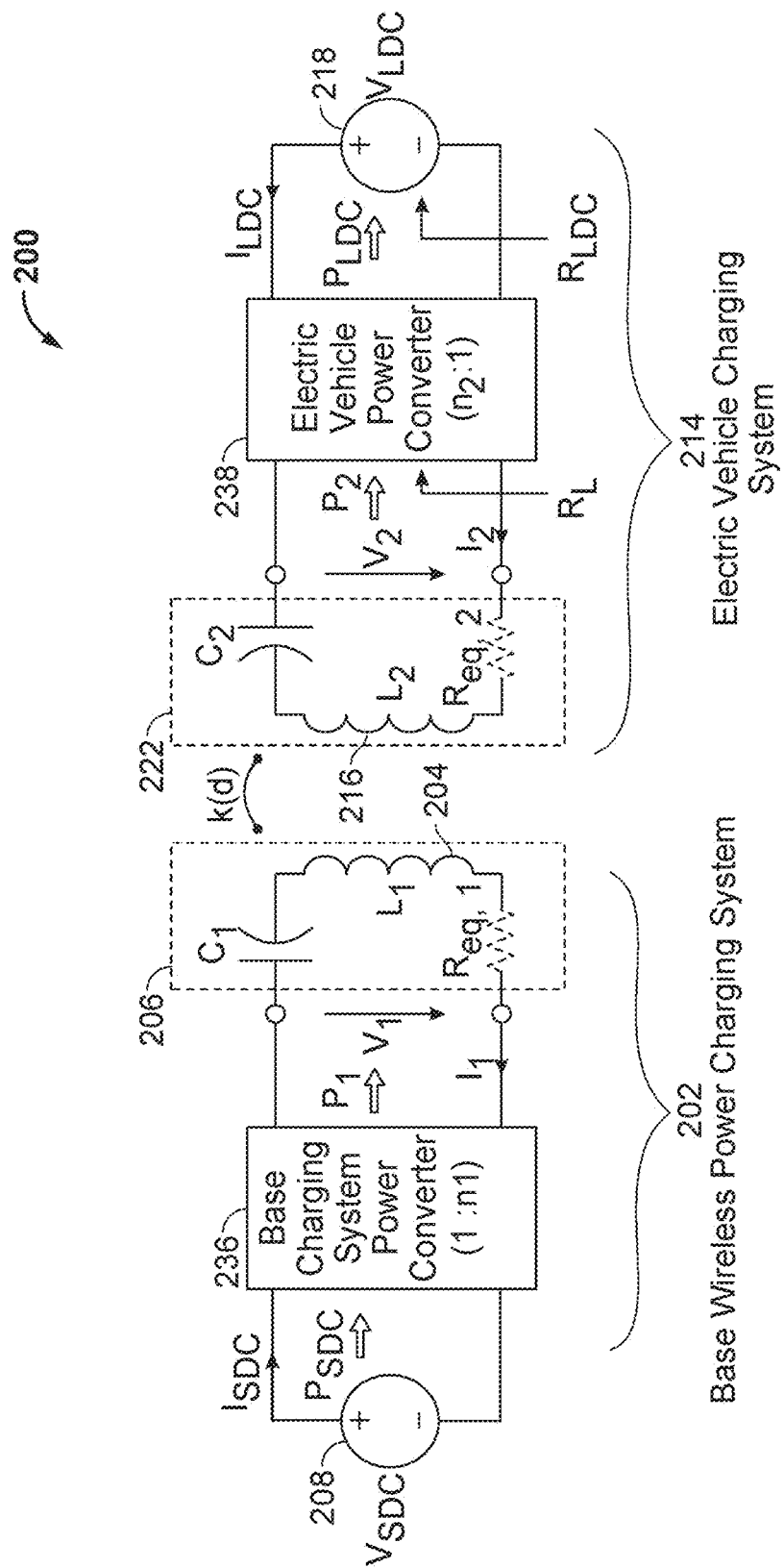
FIG. 2 is a schematic diagram of core components of the wireless power transfer system of FIG. 1.

FIG. 2 is a schematic diagram of core components of the wireless power transfer system 100 of FIG. 1. As shown in FIG. 2, the wireless power transfer system 200 may include a base system transmit circuit 206 including a base coupler 204 having an inductance $L_1$. The wireless power transfer system 200 further includes an electric vehicle receive circuit 222 including an electric vehicle coupler 216 having an inductance $L_2$. Implementations of the couplers described herein may use capacitively loaded wire loops (i.e., multi-turn coils) forming a resonant structure that is capable of efficiently coupling energy from a primary structure (transmitter) to a secondary structure (receiver) via a magnetic or electromagnetic near field if both primary and secondary couplers (e.g., coils) are tuned to a common resonant frequency. The coils may be used for the electric vehicle coupler 216 and the base coupler 204. Using resonant structures for coupling energy may be referred to "magnetic coupled resonance," "electromagnetic coupled resonance," and/or "resonant induction." The operation of the wireless power transfer system 200 will be described based on power transfer from a base wireless charging system 202 to an electric vehicle 112, but is not limited thereto. For example, as discussed above, the electric vehicle 112 may transfer power to the base wireless charging system 102a.

With reference to FIG. 2, a power supply 208 (e.g., AC or DC) supplies power $P_{SDC}$ to the base wireless charging system 202 to transfer energy to an electric vehicle 112. The base wireless charging system 202 includes a base charging system power converter 236. The base charging system power converter 236 may include circuitry such as an AC/DC converter configured to convert power from standard mains AC to DC power at a suitable voltage level, and a DC/low frequency (LF) converter configured to convert DC power to power at an operating frequency suitable for wireless high power transfer. The base charging system power converter 236 supplies power $P_1$ to the base system transmit circuit 206 including the capacitor $C_1$ in series with the base coupler 204 to emit an electromagnetic field at a desired frequency. The capacitor $C_1$ may be coupled with the base coupler 204 either in parallel or in series, or may be formed of several reactive elements in any combination of parallel or series topology. The capacitor $C_1$ may be provided to form a resonant circuit with the base coupler 204 that resonates at a desired frequency. The base coupler 204 receives the power $P_1$ and wirelessly transmits power at a level sufficient to charge or power the electric vehicle 112. For example, the power level provided wirelessly by the base coupler 204 may be on the order of kilowatts (kW) (e.g., anywhere from 1 kW to 110 kW, higher, or lower).

The base system transmit circuit 206 including the base coupler 204 and electric vehicle receive circuit 222 including the electric vehicle coupler 216 may be tuned to substantially the same frequencies and may be positioned within the near-field of an electromagnetic field transmitted by one of the base coupler 204 and the electric vehicle coupler 116. In this case, the base coupler 204 and electric vehicle coupler 116 may become coupled to one another such that power may be transferred to the electric vehicle receive circuit 222 including capacitor $C_2$ and electric vehicle coupler 116. The capacitor $C_2$ may be provided to form a resonant circuit with the electric vehicle coupler 216 that resonates at a desired frequency. The capacitor $C_2$ may be coupled with the electric vehicle coupler 204 either in parallel or in series, or may be formed of several reactive elements in any combination of parallel or series topology. Element k(d) represents the mutual coupling coefficient resulting at coil separation d. Equivalent resistances $R_{eq,1}$ and $R_{eq,2}$ represent the losses that may be inherent to the couplers 204 and 216 and the anti-reactance capacitors $C_1$ and $C_2$. The electric vehicle receive circuit 222 including the electric vehicle coupler 316 and capacitor $C_2$ receives power $P_2$ and provides the power $P_2$ to an electric vehicle power converter 238 of an electric vehicle wireless charging system 214.

The electric vehicle power converter 238 may include, among other things, a LF/DC converter configured to convert power at an operating frequency back to DC power at a voltage level matched to the voltage level of an electric vehicle battery unit 218. The electric vehicle power converter 238 may provide the converted power $P_{LDC}$ to charge the electric vehicle battery unit 218. The power supply 208, base charging system power converter 236, and base coupler 204 may be stationary and located at a variety of locations as discussed above. The battery unit 218, electric vehicle power converter 238, and electric vehicle coupler 216 may be included in an electric vehicle wireless charging system 214 that is part of electric vehicle 112 or part of the battery pack (not shown). The electric vehicle wireless charging system 214 may also be configured to provide power wirelessly through the electric vehicle coupler 216 to the base wireless charging system 202 to feed power back to the grid. Each of the electric vehicle coupler 216 and the base coupler 204 may act as transmit or receive couplers based on the mode of operation.

While not shown, the wireless power transfer system 200 may include a load disconnect unit (LDU) to safely disconnect the electric vehicle battery unit 218 or the power supply 208 from the wireless power transfer system 200. For example, in case of an emergency or system failure, the LDU may be triggered to disconnect the load from the wireless power transfer system 200. The LDU may be provided in addition to a battery management system for managing charging to a battery, or it may be part of the battery management system.

Further, the electric vehicle wireless charging system 214 may include switching circuitry (not shown) for selectively connecting and disconnecting the electric vehicle coupler 216 to the electric vehicle power converter 238. Disconnecting the electric vehicle coupler 216 may suspend charging and also may adjust the "load" as "seen" by the base wireless charging system 102a (acting as a transmitter), which may be used to "cloak" the electric vehicle wireless charging system 114 (acting as the receiver) from the base wireless charging system 102a. The load changes may be detected if the transmitter includes the load sensing circuit. Accordingly, the transmitter, such as a base wireless charging system 202, may have a mechanism for determining when receivers, such as an electric vehicle wireless charging system 114, are present in the near-field of the base coupler 204.

As described above, in operation, assuming energy transfer towards the vehicle or battery, input power is provided from the power supply 208 such that the base coupler 204 generates a field for providing the energy transfer. The electric vehicle coupler 216 couples to the radiated field and generates output power for storage or consumption by the electric vehicle 112. As described above, in some implementations, the base coupler 204 and electric vehicle coupler 116 are configured according to a mutual resonant relationship such that when the resonant frequency of the electric vehicle coupler 116 and the resonant frequency of the base coupler 204 are very close or substantially the same. Transmission losses between the base wireless charging system 202 and electric vehicle wireless charging system 214 are minimal when the electric vehicle coupler 216 is located in the near-field of the base coupler 204.

As stated, an efficient energy transfer occurs by coupling a large portion of the energy in the near field of a transmitting coupler to a receiving coupler rather than propagating most of the energy in an electromagnetic wave to the far-field. When in the near field, a coupling mode may be established between the transmit coupler and the receive coupler. The area around the couplers where this near field coupling may occur is referred to herein as a near field coupling mode region.

While not shown, the base charging system power converter 236 and the electric vehicle power converter 238 may both include an oscillator, a driver circuit such as a power amplifier, a filter, and a matching circuit for efficient coupling with the wireless power coupler. The oscillator may be configured to generate a desired frequency, which may be adjusted in response to an adjustment signal. The oscillator signal may be amplified by a power amplifier with an amplification amount responsive to control signals. The filter and matching circuit may be included to filter out harmonics or other unwanted frequencies and match the impedance of the power conversion module to the wireless power coupler. The power converters 236 and 238 may also include a rectifier and switching circuitry to generate a suitable power output to charge the battery.

The electric vehicle coupler 216 and base coupler 204 as described throughout the disclosed implementations may be referred to or configured as "loop" antennas, and more specifically, multi-turn loop antennas. The couplers 204 and 216 may also be referred to herein or be configured as "magnetic" antennas. The term "coupler" is intended to refer to a component that may wirelessly output or receive energy for coupling to another "coupler." The coupler may also be referred to as an "antenna" of a type that is configured to wirelessly output or receive power. As used herein, couplers 204 and 216 are examples of "power transfer components" of a type that are configured to wirelessly output, wirelessly receive, and/or wirelessly relay power. Loop (e.g., multi-turn loop) antennas may be configured to include an air core or a physical core such as a ferrite core. An air core loop antenna may allow the placement of other components within the core area. Physical core antennas including metallic or metallic materials may allow development of a stronger electromagnetic field and improved coupling.

As discussed above, efficient transfer of energy between a transmitter and receiver occurs during matched or nearly matched resonance between a transmitter and a receiver. However, even when resonance between a transmitter and receiver are not matched, energy may be transferred at a lower efficiency. Transfer of energy occurs by coupling energy from the near field of the transmitting coupler to the receiving coupler residing within a region (e.g., within a predetermined frequency range of the resonant frequency, or within a predetermined distance of the near-field region) where this near field is established rather than propagating the energy from the transmitting coupler into free space.

A resonant frequency may be based on the inductance and capacitance of a transmit circuit including a coupler (e.g., the base coupler 204) as described above. As shown in FIG. 2, inductance may generally be the inductance of the coupler (e.g., coil), whereas, capacitance may be added to the coupler to create a resonant structure at a desired resonant frequency. As a non-limiting example, as shown in FIG. 2, a capacitor may be added in series with the coupler to create a resonant circuit (e.g., the base system transmit circuit 206) that generates an electromagnetic field. Accordingly, for larger diameter couplers, the value of capacitance needed to induce resonance may decrease as the diameter or inductance of the coupler increases. Inductance may also depend on a number of turns of a coil. Furthermore, as the diameter of the coupler increases, the efficient energy transfer area of the near field may increase. Other resonant circuits are possible. As another non limiting example, a capacitor may be placed in parallel between the two terminals of the coupler (e.g., a parallel resonant circuit). Furthermore a coupler may be designed to have a high quality (Q) factor to improve the resonance and reduce losses of the coupler. For example, the native Q factor may be 300 or greater.

As described above, according to some implementations, coupling power between two couplers that are in the near field of one another is disclosed. As described above, the near field may correspond to a region around the coupler in which electromagnetic fields exist but may not propagate or radiate away from the coupler. Near-field coupling-mode regions may correspond to a volume that is near the physical volume of the coupler, typically within a small fraction of the wavelength. According to some implementations, electromagnetic couplers, such as single and multi-turn loop antennas, are used for both transmitting and receiving since magnetic near field amplitudes in practical implementations tend to be higher for magnetic type coils in comparison to the electric near fields of an electric type antenna (e.g., a small dipole). This allows for potentially higher coupling between the pair. Furthermore, "electric" antennas (e.g., dipoles and monopoles) or a combination of magnetic and electric antennas may be used.

Figure 3:
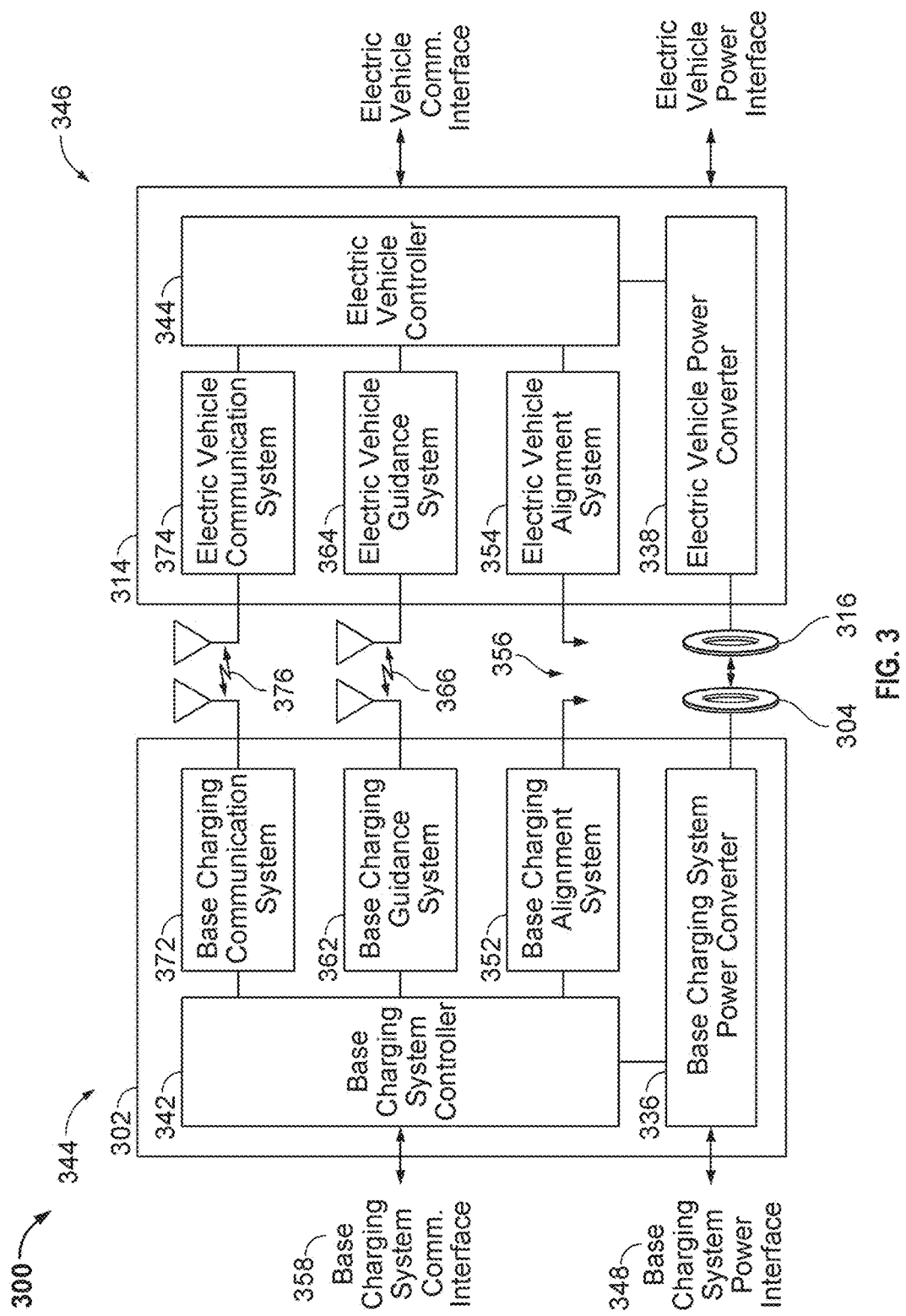
FIG. 3 is another functional block diagram showing core and ancillary components of the wireless power transfer system of FIG. 1.

FIG. 3 is another functional block diagram showing core and ancillary components of the wireless power transfer system 100 of FIG. 1 and/or that wireless power transfer system 200 of FIG. 2 may be part of. The wireless power transfer system 300 illustrates a communication link 376, a guidance link 366, and alignment mechanism 356 capable of mechanically moving one or both of the base coupler 304 and electric vehicle coupler 316 via base alignment system 352 and electric vehicle alignment systems 354. The guidance link 366 may be capable of bi-directional signaling, meaning that guidance signals may be emitted by the base guidance system 362 or the electric vehicle guidance system 364 or by both. As described above with reference to FIG. 2, and assuming energy flow towards the electric vehicle 112, in FIG. 3 a base charging system power interface 348 may be configured to provide power to a charging system power converter 336 from a power source, such as an AC or DC power supply 126. The base charging system power converter 336 may receive AC or DC power from the base charging system power interface 348 to excite the base coupler 304 at or near its resonant frequency. The electric vehicle coupler 316, when in the near field coupling-mode region, may receive energy from the near field coupling mode region to oscillate at or near the resonant frequency. The electric vehicle power converter 338 converts the oscillating signal from the electric vehicle coupler 316 to a power signal suitable for charging a battery via the electric vehicle power interface.

The base wireless charging system 302 includes a base charging system controller 342 and the electric vehicle wireless charging system 314 includes an electric vehicle controller 344. The base charging system controller 342 may include a base charging system communication interface 358 to other systems (not shown) such as, for example, a computer, and a power distribution center, or a smart power grid. The electric vehicle controller 344 may include an electric vehicle communication interface to other systems (not shown) such as, for example, an on-board computer on the vehicle, other battery charging controller, other electronic systems within the vehicles, and remote electronic systems.

The base charging system controller 342 and electric vehicle controller 344 may include subsystems or modules for specific application with separate communication channels. These communications channels may be separate physical channels or separate logical channels. As non-limiting examples, a base charging alignment system 352 may communicate with an electric vehicle alignment system 354 through a communication link 376 to provide a feedback mechanism for more closely aligning the base coupler 304 and electric vehicle coupler 316, either via autonomous, mechanical (kinematic) alignment or with operator assistance. Similarly, a base charging guidance system 362 may communicate with an electric vehicle guidance system 364 through a guidance link 366 to provide a feedback mechanism to guide an operator in aligning the base coupler 304 and electric vehicle coupler 316. In addition, there may be separate general-purpose communication links (e.g., channels) supported by base charging communication system 372 and electric vehicle communication system 374 for communicating other information between the base wireless charging system 302 and the electric vehicle wireless charging system 314. This information may include information about electric vehicle characteristics, battery characteristics, charging status, and power capabilities of both the base wireless charging system 302 and the electric vehicle wireless charging system 314, as well as maintenance and diagnostic data for the electric vehicle 112. These communication channels may be separate physical communication channels such as, for example, Bluetooth, zigbee, cellular, etc.

Electric vehicle controller 344 may also include a battery management system (BMS) (not shown) that manages charge and discharge of the electric vehicle principal battery, a parking assistance system based on microwave or ultrasonic radar principles, a brake system configured to perform a semi-automatic parking operation, and a steering wheel servo system configured to assist with a largely automated parking 'park by wire' that may provide higher parking accuracy, thus reducing the need for mechanical horizontal coupler alignment in any of the base wireless charging system 102a and the electric vehicle wireless charging system 114. Further, electric vehicle controller 344 may be configured to communicate with electronics of the electric vehicle 112. For example, electric vehicle controller 344 may be configured to communicate with visual output devices (e.g., a dashboard display), acoustic/audio output devices (e.g., buzzer, speakers), mechanical input devices (e.g., keyboard, touch screen, and pointing devices such as joystick, trackball, etc.), and audio input devices (e.g., microphone with electronic voice recognition).

Furthermore, the wireless power transfer system 300 may include detection and sensor systems. For example, the wireless power transfer system 300 may include sensors for use with systems to properly guide the driver or the vehicle to the charging spot, sensors to mutually align the couplers with the required separation/coupling, sensors to detect objects that may obstruct the electric vehicle coupler 316 from moving to a particular height and/or position to achieve coupling, and safety sensors for use with systems to perform a reliable, damage free, and safe operation of the system. For example, a safety sensor may include a sensor for detection of presence of animals or children approaching the wireless power couplers 104a, 116 beyond a safety radius, detection of objects near the base coupler 304 that may be heated up (induction heating), detection of hazardous events such as incandescent objects on the base coupler 304, and temperature monitoring of the base wireless charging system 302 and electric vehicle wireless charging system 314 components.

The wireless power transfer system 300 may also support plug-in charging via a wired connection. A wired charge port may integrate the outputs of the two different chargers prior to transferring power to or from the electric vehicle 112. Switching circuits may provide the functionality as needed to support both wireless charging and charging via a wired charge port.

To communicate between a base wireless charging system 302 and an electric vehicle wireless charging system 314, the wireless power transfer system 300 may use both in-band signaling and/or out-of-band signaling. Out-of-band communication may be carried out using a radio frequency (RF) data modem (e.g., Ethernet over radio in an unlicensed band). The out-of-band communication may provide sufficient bandwidth for the allocation of value-add services to the vehicle user/owner. A low depth amplitude or phase modulation of the wireless power carrier may serve as an in-band signaling system with minimal interference.

In addition, some communication may be performed via the wireless power link without using specific communications antennas. For example, the wireless power couplers 304 and 316 may also be configured to act as wireless communication transmitters. Thus, some implementations of the base wireless charging system 302 may include a controller (not shown) for enabling keying type protocol on the wireless power path. By keying the transmit power level (amplitude shift keying) at predefined intervals with a predefined protocol, the receiver may detect a serial communication from the transmitter. The base charging system power converter 336 may include a load sensing circuit (not shown) for detecting the presence or absence of active electric vehicle receivers in the vicinity of the near field generated by the base coupler 304. By way of example, a load sensing circuit monitors the current flowing to the power amplifier, which is affected by the presence or absence of active receivers in the vicinity of the near field generated by base coupler 104a. Detection of changes to the loading on the power amplifier may be monitored by the base charging system controller 342 for use in determining whether to enable the oscillator for transmitting energy, to communicate with an active receiver, or a combination thereof.

To enable wireless high power transfer, some implementations may be configured to transfer power at a frequency in the range from 20-150 kHz. This low operating frequency may allow highly efficient power conversion that may be achieved using solid state devices. In addition, there may be less coexistence issues with radio systems compared to other bands.

With respect to induction charging, depending on the energy transfer rate (power level), operating frequency, size and design of the primary and secondary magnetic structures and the distance between them, the flux density in the air gap at some locations may exceed 0.5 mT and may reach several Millitesla. If an object that includes a certain amount of conductive material (e.g., such as metal) is inserted into the space between the primary and secondary structures, eddy currents are generated in this object (Faraday's and Lenz's law), that may lead to power dissipation and subsequent heating effects. This induction heating effect depends on the magnetic flux density, the frequency of the time-varying magnetic field (e.g., an alternating magnetic field), and the size, shape, orientation and conductivity of the object's conducting structure. When the object is exposed to the magnetic field for a sufficiently long time, it may heat up to temperatures that may be considered hazardous in several regards. One hazard may be self-ignition if the object includes inflammable materials or if it is in direct contact with such materials, e.g., a cigarette package including a thin metallic foil or metallic film. Another hazard may be burning the hand of a person that may pick-up such a hot object, e.g., a coin or a key. Another hazard may be damaging the plastic enclosure of the primary or secondary structure, e.g., an object melting into the plastic.

A temperature increase may be also expected in objects including metallic materials that may be substantially non-conducting but exhibiting a pronounced hysteresis effect or in materials that generate both hysteresis and eddy current losses. As such, detecting such objects is beneficial to avoid corresponding harmful consequences. If the object detection system is integrated within a system for providing wireless power, in response to detecting a harmful object, the system may reduce a power level or shut down until measures may be taken to remove the harmful object. Sensing objects based on their changing temperature inductively may be called "inductive thermal sensing."

In certain applications of inductive power transfer such as charging of electric vehicles in domestic and public zones, it may be compulsory for reasons of safety of persons and equipment to be able to detect metallic objects that have the potential to heat up to critical temperatures. This may be particularly true in systems where the critical space is open and accessible such that metallic objects may get accidentally or intentionally placed in this space (e.g., in case of sabotage).

The methods and concepts disclosed herein enable inductive detection of all categories of metallic objects by mechanically inducing relative motion between the object and an inductive sensing coil and by utilizing a time-differential signal processing and detection approach. These methods may also be known as inductive kinematic sensing. As opposed to an ordinary time-differential approach, which can detect objects only when they are entering or leaving the detection space, these methods potentially enable detection of "static" objects that may have been present within the predetermined space before the foreign object detection (FOD) system is activated.

Sensors and other parts of the FOD systems disclosed herein are conceived to be integrated into or packaged with an inductive power transfer (IPT), coupler (e.g., into an IPT pad) and in particular into or with an IPT base coupler (e.g., into or with a base pad), for example, base coupler 204 of FIG. 2. However, the principal methods and concepts disclosed herein may also be incorporated into or packaged with a vehicle coupler (e.g., into or with a vehicle pad), for example, the electric vehicle coupler 216 of FIG. 2.

The IPT coupler may be one of a so-called "circular"-type coupler (using a "circular" coil), a "Double D"-type coupler (using a double coil arrangement), a "Solenoid"-type coupler (using a solenoid coil wound around a core), a "Bipolar"-type coupler (using a double coil arrangement with virtually zero coupling between coils) or any other type of coupler based on a single or multi-coil arrangement.

Descriptions and drawings herein assume a single metallic object for the sake of simplicity. However, methods and apparatuses disclosed herein generally have the potential to detect an abnormal state due to presence of more than one metallic object within a predetermined space via inductive kinematic sensing.

Some metallic objects exposed to a low frequency alternating magnetic field, e.g., an IPT magnetic field, in the range from 20 to 150 kHz with a flux density in the order of 1 mT or above may heat up to hazardous temperatures. Therefore, such objects must be considered a safety issue for an IPT system generating flux density levels in the Millitesla range in its functional space, especially if open and accessible. Hot objects laying directly on the surface of a base pad may also cause damage since they could melt or burn the plastic enclosure of the IPT coupler assembly (e.g. the base pad).

The presence of a metallic object in a predetermined space can be detected inductively by using at least one loop of an electrical conductor (e.g., an inductive sensing coil). At least one electrical characteristic, e.g., an equivalent inductance, an equivalent resistance, a frequency response, an impulse response, may be measured at the inductive sensing coil's terminals. A metallic object of sufficient size and sufficiently close to an inductive sensing coil will alter the magnetic sense field as generated by that inductive sensing coil so as to exert a measurable impact on one or more of its electrical characteristics. Furthermore, an object can be detected by comparing a detector output of at least one characteristic with a reference value of that same characteristic. The reference value may have been obtained in a process of calibration in the absence of any metallic foreign object.

For increased detection sensitivity requirements and in certain use cases, this basic approach may not suffice to provide a reliable FOD solution, e.g., if other metallic structures are located in the sensing range of the FOD system and if these structures are not static such that their effect on the electrical characteristics of the inductive sensing coil are dynamically changing, and thus, cannot be simply nullified in a calibration process. In a ground-to-vehicle inductive charging application with FOD integrated into the base pad, such disturbing metal structure may be the vehicle IPT coupler and/or the vehicle's underbody, but may not be so limited. Electrically conductive or magnetic structures in the base pad may also exert a measurable and changing effect on one or more characteristics of the inductive sensing coil. Changes may be due to, e.g., micromovements caused by mechanical stress and/or varying temperature, or due to changes of the electrical and/or magnetic material properties of these structures, e.g., as a consequence of a changing temperature or ageing. Moreover, the electrical characteristics of the inductive sensing coil may change due to mechanical stress, temperature, ageing effects, or due to changes of the electric properties of the surrounding insulating materials, causing a change of the self capacitance or ground capacitance of the inductive sensing coil. The effects of such a changing environment may be manageable in a system designed for detecting metallic objects located near a surface (e.g., essentially in a two-dimensional space), but may become a major challenge in a FOD system designed for increased sensitivity, e.g., for detecting metallic objects in a three-dimensional space.

An enhanced FOD with increased detection sensitivity on metallic foreign objects can generally be achieved by using a time-differential (TD) detection scheme, which does not apply absolute decision criteria but rather bases its decisions on a rate of change (e.g., first derivative) in time sequences of detector outputs. An FOD system based on a TD approach can potentially detect metallic objects when they are entering or leaving the detection space, but it may be unable to detect "static" metallic objects that may have been present before the FOD system is activated.

The inventors found that "static" metallic objects (objects that may have been present before FOD is activated) can be made potentially detectable, e.g., using a time-differential or correlation approach, if the object is moved relative to the inductive sense coil. This may be accomplished by mechanically moving either the object or the FOD sense coil back and forth in at least one of an x-, y-, and z-axis directions.

Figure 4:
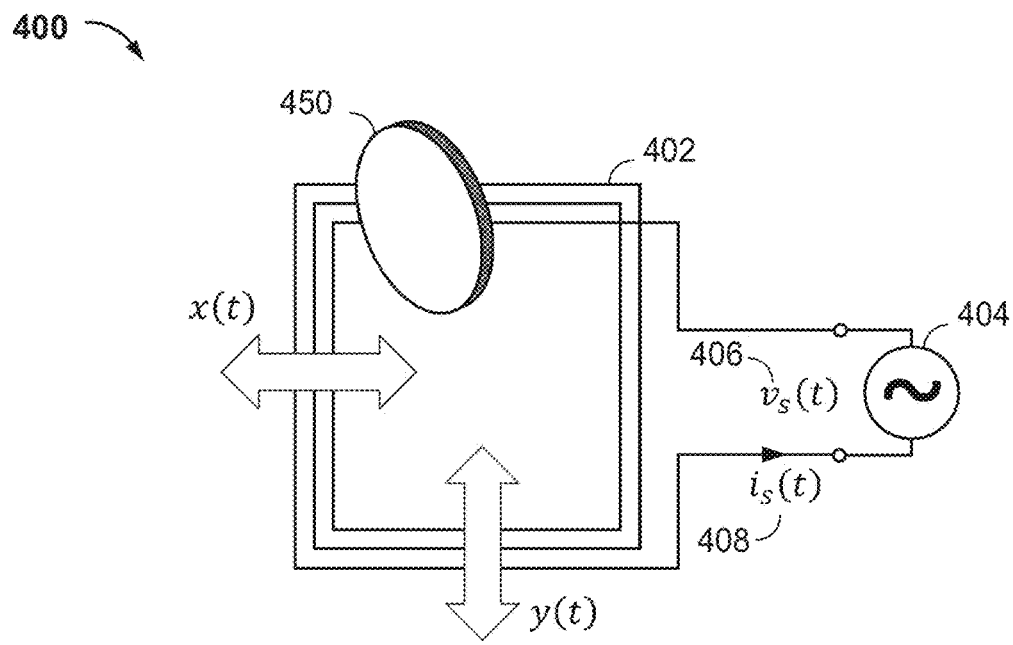
FIG. 4 is a diagram of a circuit for detecting a metallic object using inductive kinematic sensing via an inductive sensing coil, in accordance with some implementations.

FIG. 4 is a diagram of a circuit 400 for detecting a metallic object (e.g., metallic object 450) using inductive kinematic sensing via an inductive sensing coil 402, in accordance with some implementations. The circuit 400 includes the inductive sensing coil 402, which may comprise a coil of one or more loops, and a metallic object 450. The inductive sensing coil 402 may be excited by a sinusoidal signal source 404 at a voltage $v_s$ (t) 406 and a sense frequency ($f_s$) resulting in a sense current $i_s$ (t) 408. Since equivalent inductance and resistance of the inductive sensing coil 402 are functions of the conductivity σ of the metallic object 450 and the permeability μ of the metallic object 450, respectively, a presence of the metallic object 450 can be potentially detected by analyzing the change in current $i_s(t)$ 408 in relation to source voltage $v_s(t)$ 406 as the inductive sensing coil 402 is moved in one or more of the x, y or z directions, as shown by x(t), y(t) and potentially also a mutually orthogonal z(t) direction that is not shown in FIG. 4. Further examples of such an electrical characteristic measurable include but are not limited to an equivalent inductance, an equivalent resistance, a frequency response, or an impulse response may be measured at the terminals of the inductive sensing coil 402. Furthermore, the metallic object 405 may be detected by processing a detector output of at least one electrical characteristic and comparing the result with a reference value. The reference value may have been previously obtained in a process of calibration in the absence of any metallic object.

Figure 5:
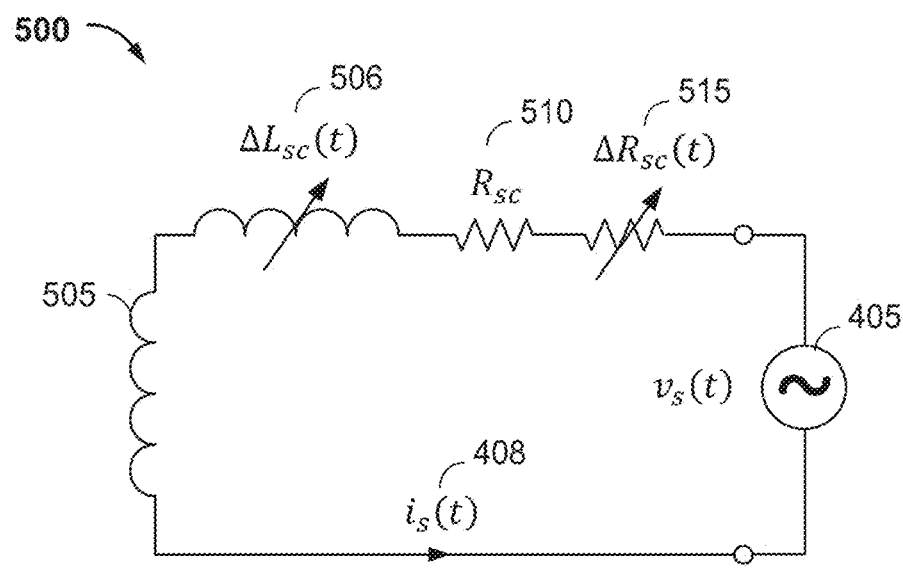
FIG. 5 is an equivalent circuit diagram of the circuit for detecting the metallic object of FIG. 4.

FIG. 5 is an equivalent circuit 500 diagram of the circuit 400 for detecting the metallic object 450 of FIG. 4. The equivalent circuit 500 may be applicable to a sinusoidal excitation of an inductive sensing coil (e.g., the inductive sensing coil 402 of FIG. 4) by the voltage $v_s$ (t) 405 having frequency $f_s$, which induces the current $i_s(t)$ 408 to circulate in the equivalent circuit 500. The equivalent circuit 500 comprises a series inductance $L_{sc}$ 505 representing the system's overall energy storage effect and a series resistance $R_{sc}$ 510 representing the system's overall loss effect. The equivalent circuit 500 also comprises differential inductance $\Delta L_{sc}(t)$ 506 and differential resistance $\Delta R_{sc}$ (t) 515, which represent the inductive and resistive effects, respectively, exerted by a metallic object (e.g., the metallic object 450 of FIG. 4) in the influence zone of the inductive sensing coil (e.g., the inductive sensing coil 402 of FIG. 4) while the inductive sensing coil 402 is being moved in one or more directions or rotated relative to the stationary metallic object 450.

Figure 6:
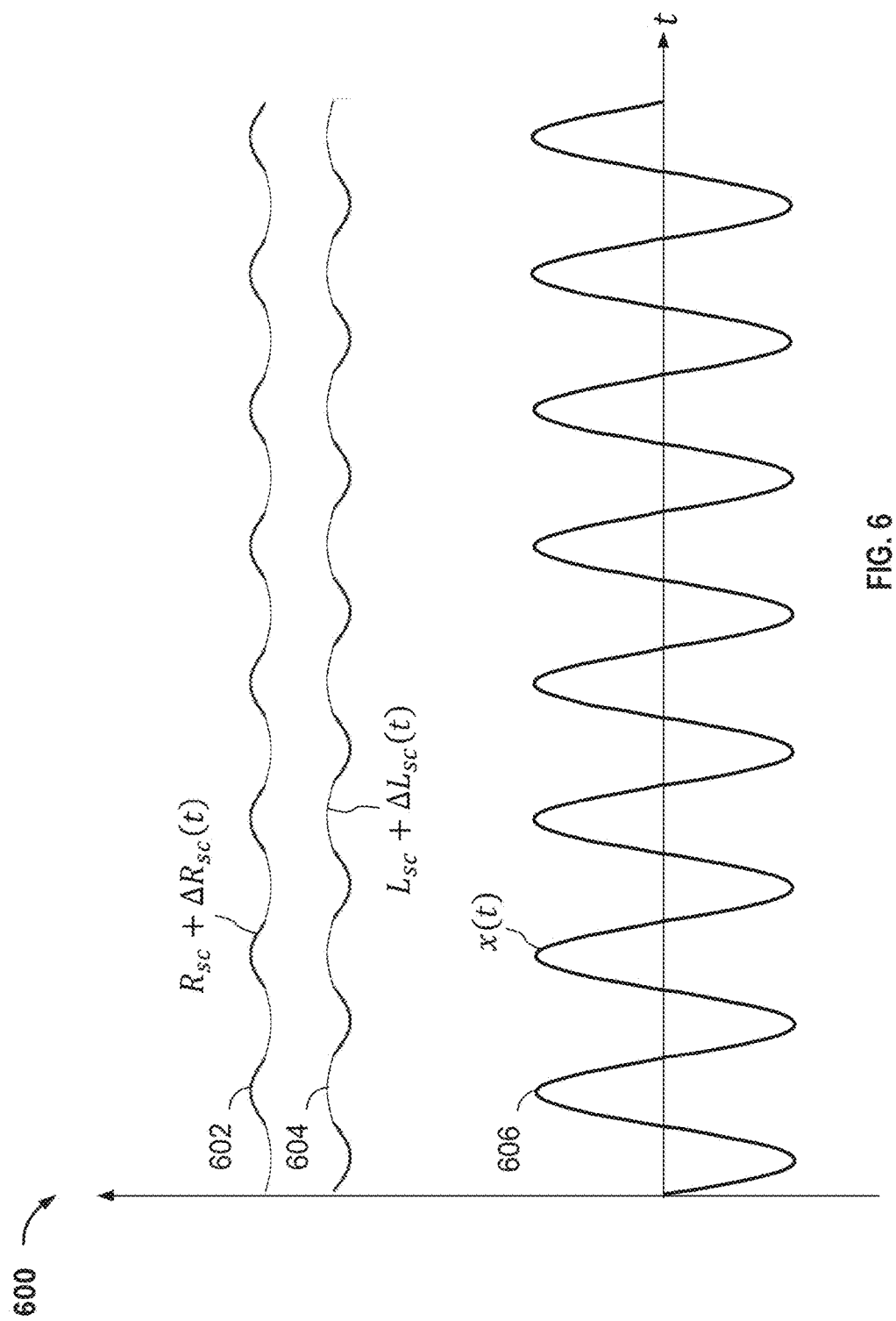
FIG. 6 shows various time courses illustrating the effect of the metallic object that is linearly and periodically moving relative to the inductive sensing coil in an x-axis direction, in accordance with some implementations.

FIG. 6 shows various time courses illustrating the effect of the metallic object 450 that is linearly and periodically moving relative to the inductive sensing coil 402 in an x-axis direction, in accordance with some implementations. A first time course illustrates the time-varying equivalent resistance 602 $R_{sc}+\Delta R_{sc}(t)$ of the inductive sensing coil 402. A second time course illustrates a time-varying equivalent inductance 604 $L_{sc}+\Delta L_{sc}$ (t) of the inductive sensing coil 402. A third time course illustrates a sinusoidally varying x-position 606 of the inductive sensing coil 402 with respect to the metallic object 450. In some implementations, the motion of the inductive sensing coil 402 is sinusoidal in at least one of 3 mutually orthogonal directions.

In one implementation that uses a sinusoidal mechanical excitation $x(t)=\hat{x} \sin 2\pi f_m$, the resulting modulation effect can be generally observed in the time-domain as a non-linear function of x(t) and in the frequency domain as a fundamental and harmonics of the mechanical excitation frequency $f_m$, depending on the size, shape, and position of the metallic object 450 relative to the inductive sensing coil 402. The degree of modulation depends on the impact of the metallic object 450 on the equivalent inductance and resistance of the inductive sensing coil 402 and the peak amplitude $\hat{x}$ of the mechanical excitation x(t).

Figure 7:
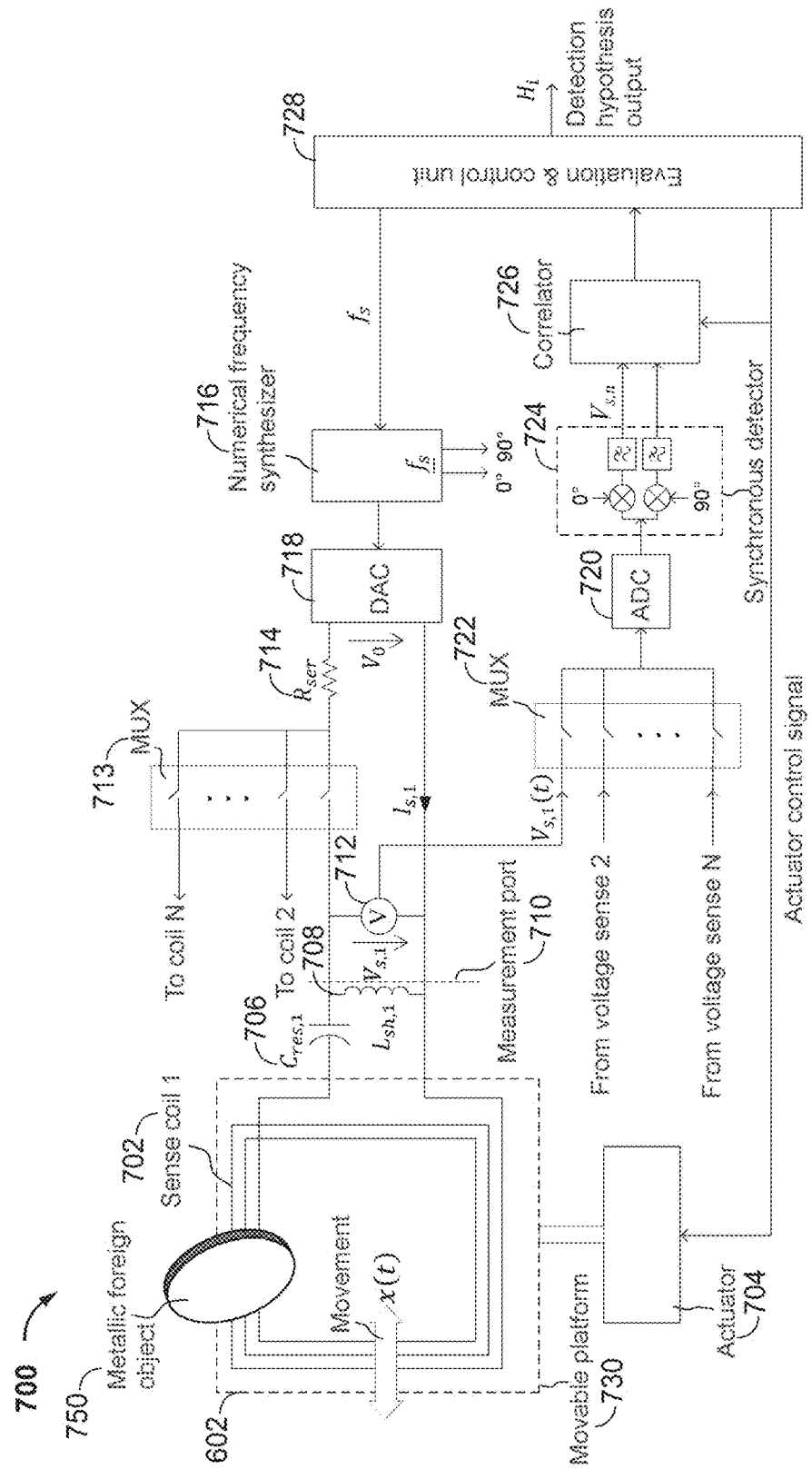
FIG. 7 is a schematic diagram of a metallic foreign object detection system utilizing inductive kinematic sensing, in accordance with some implementations.

FIG. 7 is a schematic diagram of a metallic foreign object detection system 700 utilizing inductive kinematic sensing, in accordance with some implementations. The system 700 uses a plurality (N) of inductive sensing coils, e.g., a coil array as it may be required to provide sufficient detection sensitivity over an entire surface area of an IPT coupler (e.g., a base pad). However, for simplicity, only one inductive sensing coil 702 is shown. The system 700 also includes an actuator 704 configured to mechanically move the inductive sensing coil 702 (e.g., the array) with respect to a metallic object 750. The sense circuitry may comprise a capacitor 706 having capacitance $C_{res}$ connected in series with the inductive sensing coil 702, a shunt inductor 708 having inductance $L_{sh}$ connected in parallel with a measurement port 710 indicated by the dashed line shown in FIG. 7. The sense circuitry may be further characterized by a voltage sensor 712 operationally coupled to the sense circuit at the measurement port 710 and by a sense signal source connected to the measurement port 710 via a resistor 714 having resistance $R_{res}$ and via an N-port multiplexer 713. Such a sense signal source may comprise a voltage source configured to generating a sinusoidal (e.g., harmonic) sense signal at a sense frequency $f_s$, which may be in the MHz range, for example around 3 MHz.

In some implementations as shown in FIG. 7, the sense signal source may comprise a numerical frequency synthesizer 716 feeding a Digital-to-Analogue Converter (DAC)

718. The DAC 718 provides an analog voltage source output connected via the resistor 714 and the N-port multiplexer 713 to the measurement port 710. The resistance $R_{ser}$ of the resistor 714 may also include the on-state serial resistance of the switches within the N-port multiplexer 713. FIG. 7 illustrates the resistor 714 common to each of the plurality of N inductive sensing coils, including the inductive sensing coil 702. In some other implementations, however, it may be preferable to connect the N-port multiplexer 713 directly to the sense signal source and to connect N resistors (not shown) downstream of the N-port multiplexer 713, between the respective outputs of the N-port multiplexer 713 and the respective measurement port 710. Such a configuration may have fewer issues with parasitic parallel capacitance from analogue switches at the measurement port 710.

An output voltage $V_o$ of the DAC 718 and the resistance $R_{ser}$ of the resistor 714 may be dimensioned to act substantially as a constant alternating current (AC) source driving a quasi-constant sinusoidal current into the inductive sensing coil 702 selected by the N-port multiplexer 713.

Furthermore, FIG. 7 shows each of N voltage sensor 712 outputs (e.g., $V_{s,i}(t)$) connected to an Analogue-to-Digital Converter (ADC) 720 via a second N-port multiplexer 722 (e.g., a set of analogue switches). The ADC 720 may include analogue signal preconditioning, such as pre-amplifying and anti-aliasing filtering, that is not shown in detail in FIG. 7. Narrowband filtering and detection of the complex voltage waveform $V_{s,i}(t)$ may then be performed in the digital (e.g., numerical) domain. The voltage waveform $V_{s,i}(t)$ may be detected utilizing at least one synchronous detector 724. The synchronous detector 724 may comprise a quadrature mixer, a low pass filter with a cut-off frequency preferably in the order of 100 Hz and a complex (e.g., in-phase and quadrature) output delivering a complex amplitude denoted by $\underline{V}_{s,n}$, where n refers to the n-th inductive sensing coil. The low pass filter within the synchronous detector 724 may be a FIR-type filter optimally dimensioned with respect to filtering requirements and detection time constraints of a particular implementation. It shall be noticed that in a FOD system using N inductive sensing coils and time multiplexing, available detection time for each inductive sensing coil reduces to 1/N of the total detection time. In-phase and quadrature-phase numerical frequency waveforms (0°, 90°) as needed for the quadrature mixer of the synchronous detector 724 may also be generated by the numerical frequency synthesizer 716 at frequency $f_s$.

In some implementations, the real and imaginary parts of $\underline{V}_{s,n}$, may reflect an equivalent resistance and inductance, respectively, of the inductive sensing coil 702, however requiring the complex voltage to be correctly measured and mapped in terms of both magnitude and phase. True complex voltage mapping may provide most information to discriminate between potential objects and other disturbances e.g., dielectric objects, which may also be detected by the capacitive sensing effect as normally pertinent to a multi-turn inductive sensing coil 702 if operated in the MHz frequency range. True voltage mapping however may require the system 700 to compensate for any phase error that is introduced by the analog circuitry between the DAC 718 and the ADC 720, as well as by other imperfections in the sense circuitry and inductive sensing coil array. This phase error may generally vary with frequency, temperature and aging of components and may also depend on the particular inductive sensing coil selected by the N-port multiplexer 713 and by the N-port multiplexer 722.

The complex output $\underline{V}_{s,n}$ of the synchronous detector 724 is correlated with an actuator control signal by a correlator 726. The output of the correlator 726 may be evaluated by an evaluation & control unit 728 that provides an output for delivering a detection hypothesis, which may include an indication of a presence of a metallic object within the predetermined space. The evaluation & control unit 728 may also control the actuator 704, which adjusts a moveable platform 730 on which the inductive sensing coil 702 is located.

The evaluation & control unit 728 may determine a presence of a potential object by comparing a detected set of correlator outputs against a set of reference values using an appropriate metric and threshold. Such reference values may be obtained in a process of system calibration. The evaluation & control unit 728 may also perform a space-differential post detection using an adaptive decision threshold as further explained below.

Alternatively, a time-differential detection scheme that detects potential objects based on a temporal change in time sequences of $\underline{V}_{s,n}$ may apply. Using a time-differential approach may however also increase sensitivity on other disturbing effects such as caused, e.g., by the vehicle underbody or micro-movements in the IPT coupler as previously mentioned. The latter may be mitigated using the plurality of sense coils, e.g., a sense coil array and a space-differential approach. In a space-differential approach, the FOD system may determine presence of a potential object based on differences between detector outputs as obtained with a sense coil array, knowing that these disturbances normally affect a multitude (cluster) of sense coils. In a space-differential detection scheme, detection sensitivity automatically reduces, e.g., when the vehicle underbody is moving.

In one implementation, space-differential detection is achieved using an adaptive (dynamic) decision threshold, which is a function of the median value ($50^{th}$ percentile) of all detector outputs as obtained with a sense coil array.

In some implementations, the evaluation and control unit 728 may apply a different scaling (e.g., weighing coefficient) to each of the real and imaginary parts of $\underline{V}_{s,n}$ in order to discriminate a certain category of objects. For example, the evaluation and control unit 728 may apply a lower scaling factor for the imaginary part than for the real part. This may help to reduce a sensitivity to the presence of dielectric objects.

In some implementations and as shown in FIG. 7, the evaluation & control unit 728 may also control the sense frequency $f_s$ in order to mitigate switching noise. For example, switching noise and harmonic content produced by the IPT power source may be coupled into the inductive sensing coil 702 via the IPT coil (not shown) and may fall on frequencies where FOD is sensitive. Therefore, in some implementations active interference mitigation may be performed by controlling the sense frequency $f_s$ for each inductive sensing coil individually, while maintaining $f_s$ within some tolerance range near resonance of the sense circuit. Under given constraints, sense frequencies may be chosen so as to minimize switching noise falling into the sensitive frequency ranges as defined by the bandwidth of the synchronous detector 724 and to keep IPT harmonics and possible modulation side-bands thereof outside of these frequencies. For such purposes, the FOD system 700 and in particular the evaluation & control unit 728 may perform some sort of spectral analysis of the switching noise to determine an optimal or preferred sense frequency $f_s$ for each inductive sensing coil of the array. Reassigning optimal or preferred sense frequencies $f_s$ to inductive sensing coils may be performed periodically or dynamically on a short term basis, e.g., in a system where the noise spectrum is dynamically changing as a consequence of the IPT system control.

Figure 8:
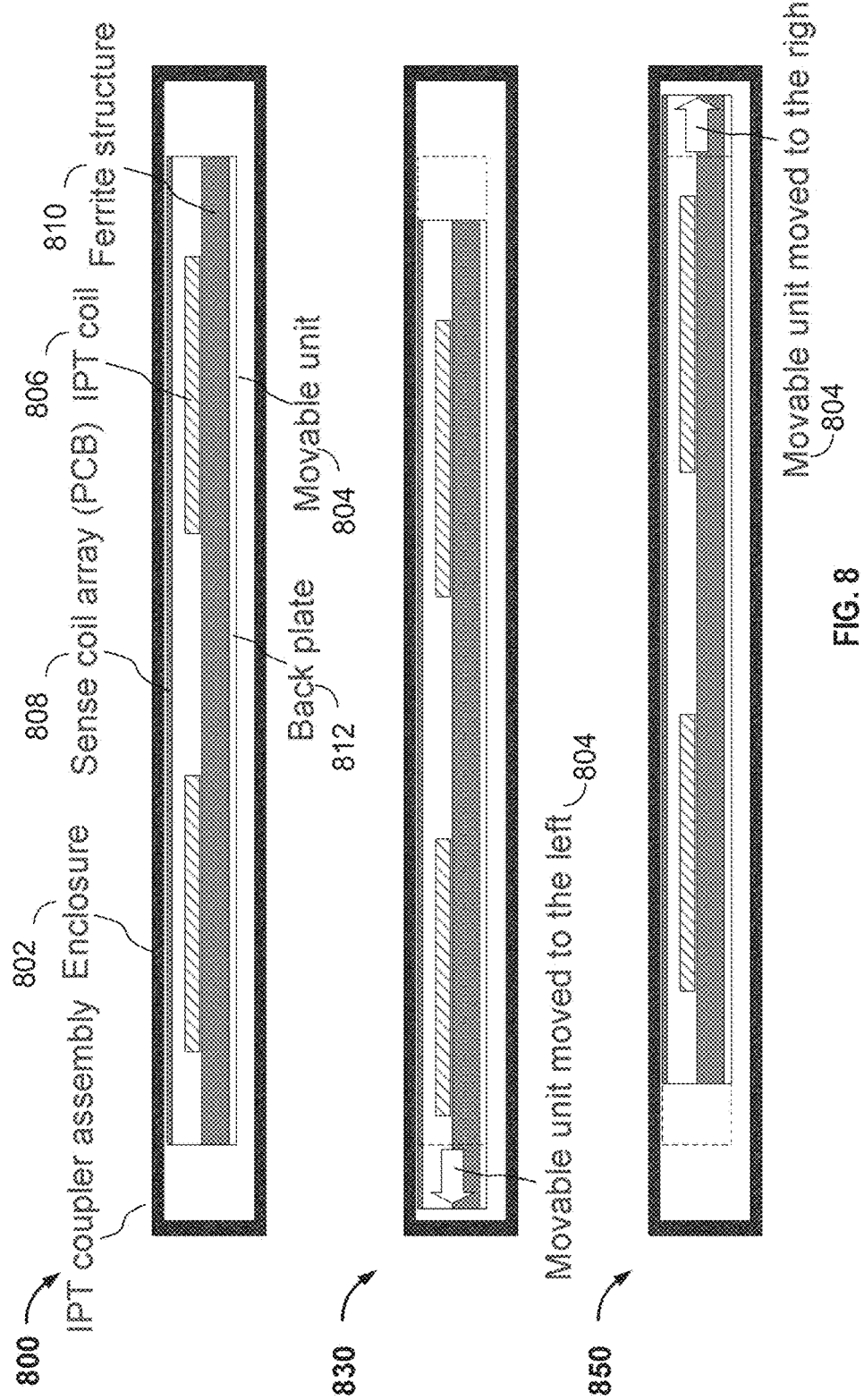
FIG. 8 illustrates an IPT coupler assembly integrating an FOD system, in accordance with some implementations.

FIG. 8 illustrates an IPT coupler assembly 800 integrating an FOD system, in accordance with some implementations. The IPT coupler assembly 800 comprises a "fixed" enclosure 802 and a moveable unit 804. The moveable unit 804 comprises an inductive power transfer coil 806 (IPT coil) having a fixed position relative to the inductive sensing coil (e.g., within the sensing coil array 808), a planar ferrite structure 810 (e.g. soft ferrite material) backing the IPT coil 806, and a conductive back plate 812 (e.g., made of aluminum) disposed on a surface of the planar ferrite structure 810 opposite to the surface of the IPT coil 806.

The IPT coupler assembly 800 further comprises the FOD system including the FOD inductive sensing coil array 808 (PCB) and FOD electronics (not shown in FIG. 8). The moveable unit 804 may be driven by an actuator (see the actuator 704 in FIG. 7) and may move back and forth in a range of, e.g., +/−1 cm, or less, or more in at least one axis direction e.g., in one or more of an x-, y-, or z-axis direction. In some implementations, the moveable unit 804 may rotate about an axis. Rotation may be centric, eccentric, or otherwise irregular. In further implementations (not shown), the moveable unit may move up and down in a z-axis direction.

As shown in FIG. 8, view 830 may show the moveable unit 804 moved to the left side of the page, while view 850 shows the moveable unit 804 moved to the right side of the page. Note that in each of views 830 and 850, the moveable unit 804 moves with respect to the enclosure 802.

In yet another implementation (not shown), only a top cover of an enclosure of a base IPT coupler assembly is moving translationally or rotationally with the actual IPT coupler and the FOD inductive sensing coil array being fixed. Thus, objects laying on the top cover surface will move relative to the inductive sensing coil array.

In some implementations, foreign object detection by mechanically moving the FOD inductive sensing coils relative to an object (e.g., by inductive kinematic sensing) may be applied initially when foreign object detection is activated (e.g., powered on) or before a vehicle has parked over the charging base or before starting inductive power transfer. If the system determines a presence of a metallic object, the system may not start inductive power transfer. During power transfer, the system may employ at least one FOD method, e.g., a method that is suitable for detecting an object that enters the critical space when the system is active, e.g., based on a time- and/or space-differential approach, not requiring mechanical movement. This may be one of an inductive sensing method, a radar-based method and any other sensing method. In the event a metallic object is detected, the system may verify this detection by first ceasing regular power transfer and reapplying inductive kinematic sensing. This may particularly apply for a positive detection hypothesis with low confidence. If the previously found positive hypothesis is confirmed, the system may discontinue power transfer. Else it reactivates regular power transfer.

If the moving part includes the IPT coupler and the movement range is sufficient, the moveable IPT coupler may also serve as a mechanical alignment system, e.g., a "y-axis mover" to achieve better alignment with the vehicle-side IPT coupler, which may result in a wireless electric vehicle wireless charging system with increased alignment tolerance.

If the moving part is the top cover or the top surface of a base IPT coupler assembly, the moveable part may also serve to dislocate a metallic object to a location outside of the critical space where there is no substantial induction heating effect. In an implementation, the top surface is constituted by a plastic belt that is circulating, e.g., around the IPT coupler assembly similarly to a treadmill using idler pulleys (drums) on the right and left-hand side of the assembly.

Figure 9:
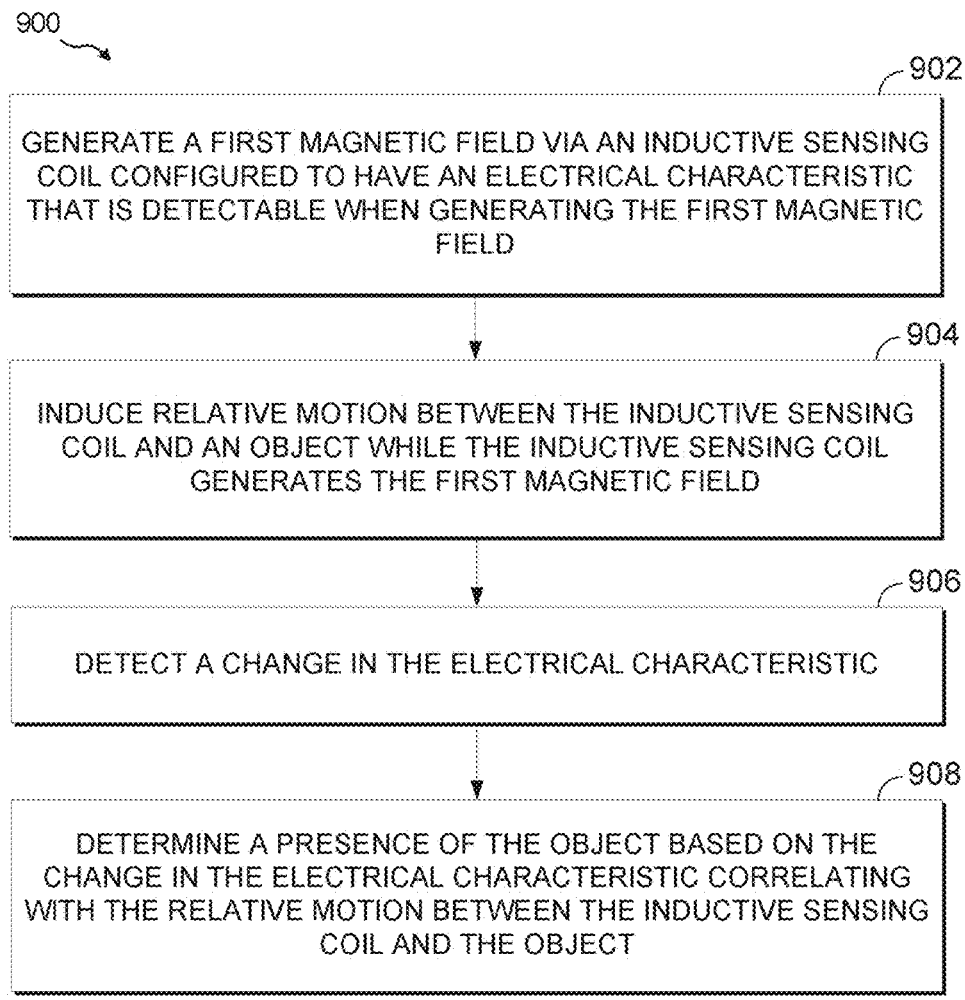
FIG. 9 is a flowchart of a method for detecting the presence of an object, in accordance with some implementations.

FIG. 9 is a flowchart 900 of a method for detecting the presence of an object, in accordance with some implementations. Although the method of flowchart 900 is described herein with reference to the circuits and/or devices as discussed above with respect to FIGS. 4-8, a person having ordinary skill in the art will appreciate that the method of flowchart 900 may be implemented by other suitable devices and systems. Although the method of flowchart 900 is described herein with reference to a particular order, in various implementations, blocks herein may be performed in a different order, or omitted, and additional blocks may be added.

Operation block 902 includes generating a magnetic field via an inductive sensing coil configured to have an electrical characteristic that is detectable when generating the magnetic field. For example, as previously described in connection with FIGS. 4 and 5 the inductive sensing coil 402 is configurable to generate a magnetic field when driven by a sinusoidal signal source 404. The inductive sensing coil 402 is configured to have an electrical characteristic that is detectable when generating the magnetic field. For example, the electrical characteristic comprises one or more of an equivalent resistance 602, an equivalent inductance 604, an equivalent impedance (602+604), and an impulse response of the inductive sensing coil 402. Although the present application is not so limited and the electrical characteristic may include any other characteristic, including but not limited to a voltage $V_{s,l}$ appearing across or a current $I_{s,l}$ being driven through the inductive sensing coil 402, 702, or even a phase, real component, or imaginary component of that voltage or current. In some implementations, the inductive sensing coil 402, 702 may also be known as or may form at least a portion of "means for generating a magnetic field".

Operation block 904 includes inducing relative motion between the inductive sensing coil and an object while the inductive sensing coil generates the magnetic field. For example, as previously described in connection with FIG. 7 an actuator 704 may be configured to move or rotate the inductive sensing coil 402, 702 while the inductive sensing coil 402, 702 generates the magnetic field. In some other implementations, the actuator 704 may be configured to move or rotate the object by, e.g., rotating a cover on which the object 450, 750 may be supported relative to the inductive sensing coil 402, 702. In some implementations, the motion of the inductive sensing coil 402, 702 and/or of the object 450, 750 is substantially sinusoidal in at least one of 3 mutually orthogonal directions (e.g., an x-, y- and/or z-direction. In some implementations, the actuator 704 may also be known as, or may comprise at least a portion of "means for inducing relative motion between the means for generating the magnetic field and an object."

Operation block 906 includes detecting a change in the electrical characteristic. For example, the controller (e.g., one or more of the evaluation & control unit 728, the correlator 726, the synchronous detector 724, and the multiplexer 722) may be configured to determine a presence of the object 450, 750 based on the change in the electrical characteristic correlating with the relative motion between the inductive sensing coil 402, 702 and the object 450, 750. In some implementations, the controller (e.g., one or more of the evaluation & control unit 728, the correlator 726, the synchronous detector 724, and the multiplexer 722) may also be known as, or may comprise at least a portion of "means for detecting a change in the electrical characteristic."

Operation block 908 includes determining a presence of the object based on the change in the electrical characteristic correlating with the relative motion between the inductive sensing coil and the object. For example, the controller (e.g., one or more of the evaluation & control unit 728, the correlator 726, the synchronous detector 724, and the multiplexer 722) may be configured to determine a presence of the object 450, 750 based on the change in the electrical characteristic correlating with the relative motion between the inductive sensing coil 402, 702 and the object 450, 750, as previously described in connection with at least FIG. 7. Thus, in some implementations, the controller (e.g., one or more of the evaluation & control unit 728, the correlator 726, the synchronous detector 724, and the multiplexer 722) is configured to detect the change in the electrical characteristic in the time domain. In some implementations, the object 450, 750 comprises one or more of a metallic object, a metallic film, a metallic foil, or any other object having a substantially non-zero conductivity and/or permittivity. In some implementations, the controller may also be known as or comprise at least a portion of "means for determining a presence of the object based on the change in the electrical characteristic correlating with the relative motion between the means for generating the magnetic field and the object."

In some implementations, the inductive sensing coil 402, 702 may be one of a plurality of inductive sensing coils. In such implementations, the flowchart 900 may further comprise (not shown) multiplexing measurements of a plurality of changes in the electrical characteristic of the plurality of inductive sensing coils. For example, the controller (e.g., one or more of the evaluation & control unit 728, the correlator 726, the synchronous detector 724, and the multiplexer 722) may be further configured to multiplex measurements of a plurality of changes in the electrical characteristic of the plurality of inductive sensing coils. In such implementations, the controller may also be known as, or comprise at least a portion of "means for multiplexing measurements of a plurality of changes in the electrical characteristic of the plurality of inductive sensing coils."

In some implementations, the flowchart 900 may further comprise (not shown) reducing sensitivity to detection of dielectric objects by applying a first scaling factor to a real component of a voltage induced across the inductive sensing coil while the inductive sensing coil generates the magnetic field, and applying a second scaling factor to an imaginary component of the voltage. For example, the controller (e.g., one or more of the evaluation & control unit 728, the correlator 726, the synchronous detector 724, and the multiplexer 722) is further configured to reduce sensitivity to detection of dielectric objects by applying a first scaling factor to a real component of a voltage $V_s$ induced across the inductive sensing coil while the inductive sensing coil generates the magnetic field, and by applying a second scaling factor to an imaginary component of the voltage $V_s$. In such implementations, the controller may also be known as, or comprise at least a portion of "means for applying a first scaling factor to a real component of a voltage induced across the means for generating the magnetic field" and "means for applying a second scaling factor to an imaginary component of the voltage to reduce sensitivity to detection of dielectric objects."

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and method steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the implementations.

The various illustrative blocks, modules, and circuits described in connection with the implementations disclosed herein may be implemented or performed with a general purpose hardware processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose hardware processor may be a microprocessor, but in the alternative, the hardware processor may be any conventional processor, controller, microcontroller, or state machine. A hardware processor may also be implemented as a combination of computing devices, e.g., a combination of a DSP and a microprocessor, a plurality of microprocessors, one or more microprocessors in conjunction with a DSP core, or any other such configuration.

The steps of a method and functions described in connection with the implementations disclosed herein may be embodied directly in hardware, in a software module executed by a hardware processor, or in a combination of the two. If implemented in software, the functions may be stored on or transmitted as one or more instructions or code on a tangible, non-transitory, computer readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the hardware processor such that the hardware processor can read information from, and write information to, the storage medium. In the alternative, the storage medium may be integral to the hardware processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The hardware processor and the storage medium may reside in an ASIC.

For purposes of summarizing the disclosure, certain aspects, advantages and novel features s have been described herein. It is to be understood that not necessarily all such advantages may be achieved in accordance with any particular implementation. Thus, the invention may be embodied or carried out in a manner that achieves or optimizes one advantage or group of advantages as taught herein without necessarily achieving other advantages as may be taught or suggested herein.

Various modifications of the above described implementations will be readily apparent, and the generic principles defined herein may be applied to other implementations without departing from the spirit or scope of the application. Thus, the present application is not intended to be limited to the implementations shown herein but is to be accorded the widest scope consistent with the principles and novel features disclosed herein.

What is claimed is:

1. An apparatus for detecting an object, comprising:
an inductive sensing coil that is configurable to generate a magnetic field, the inductive sensing coil configured to have an electrical characteristic that is detectable when generating the magnetic field;
an actuator configured to induce relative motion between the inductive sensing coil and the object while the inductive sensing coil generates the magnetic field; and
a controller configured to:
detect a change in the electrical characteristic, and
determine a presence of the object based on the change in the electrical characteristic correlating with the relative motion between the inductive sensing coil and the object.

2. The apparatus of claim 1, wherein the electrical characteristic comprises one or more of an equivalent resistance, an equivalent inductance, an equivalent impedance, and an impulse response of the inductive sensing coil.

3. The apparatus of claim 1, wherein the object comprises one or more of a metallic object, a metallic film and a metallic foil.

4. The apparatus of claim 1, wherein the inductive sensing coil comprises a plurality of inductive sensing coils and wherein the controller is further configured to multiplex measurements of a plurality of changes in the electrical characteristic of the plurality of inductive sensing coils.

5. The apparatus of claim 1, wherein the controller is further configured to reduce sensitivity to detection of dielectric objects by applying a first scaling factor to a real component of a voltage induced across the inductive sensing coil while the inductive sensing coil generates the magnetic field, and by applying a second scaling factor to an imaginary component of the voltage.

6. The apparatus of claim 1, further comprising an inductive power transfer coil having a fixed position relative to the inductive sensing coil.

7. The apparatus of claim 1, wherein the controller is configured to detect the change in the electrical characteristic in the time domain.

8. The apparatus of claim 1, wherein the relative motion between the inductive sensing coil and the object is induced via motion of the inductive sensing coil, wherein the motion of the sensing coil is substantially sinusoidal in at least one of 3 mutually orthogonal directions.

9. A method for detecting an object, comprising:
generating a magnetic field via an inductive sensing coil configured to have an electrical characteristic that is detectable when generating the magnetic field,
inducing relative motion between the inductive sensing coil and the object while the inductive sensing coil generates the magnetic field,
detecting a change in the electrical characteristic, and
determining a presence of the object based on the change in the electrical characteristic correlating with the relative motion between the inductive sensing coil and the object.

10. The method of claim 9, wherein the electrical characteristic comprises one or more of an equivalent resistance, an equivalent inductance, an equivalent impedance, and an impulse response of the inductive sensing coil.

11. The method of claim 9, wherein the object comprises one or more of a metallic object, a metallic film and a metallic foil.

12. The method of claim 9, wherein the inductive sensing coil comprises a plurality of inductive sensing coils, the method further comprising multiplexing measurements of a plurality of changes in the electrical characteristic of the plurality of inductive sensing coils.

13. The method of claim 9, further comprising reducing sensitivity to detection of dielectric objects by applying a first scaling factor to a real component of a voltage induced across the inductive sensing coil while the inductive sensing coil generates the magnetic field, and applying a second scaling factor to an imaginary component of the voltage.

14. The method of claim 9, further comprising maintaining a fixed position of an inductive power transfer coil relative to the inductive sensing coil.

15. The method of claim 9, wherein the relative motion between the inductive sensing coil and the object is induced via motion of the inductive sensing coil, wherein the motion of the sensing coil is substantially sinusoidal in at least one of 3 mutually orthogonal directions.

16. A non-transitory, computer-readable medium comprising code that, when executed, causes an apparatus for detecting an object to:
generate a magnetic field via an inductive sensing coil configured to have an electrical characteristic that is detectable when generating the magnetic field,
induce relative motion between the inductive sensing coil and the object while the inductive sensing coil generates the magnetic field,
detect a change in the electrical characteristic, and
determine a presence of the object based on the change in the electrical characteristic correlating with the relative motion between the inductive sensing coil and the object.

17. The medium of claim 16, wherein the electrical characteristic comprises one or more of an equivalent resistance, an equivalent inductance, an equivalent impedance, and an impulse response of the inductive sensing coil.

18. The medium of claim 16, wherein the object comprises one or more of a metallic object, a metallic film and a metallic foil.

19. The medium of claim 16, wherein the inductive sensing coil comprises a plurality of inductive sensing coils, the code, when executed, further causing apparatus to multiplex measurements of a plurality of changes in the electrical characteristic of the plurality of inductive sensing coils.

20. The medium of claim 16, wherein the code, when executed, further causes the apparatus to reduce sensitivity to detection of dielectric objects by applying a first scaling factor to a real component of a voltage induced across the inductive sensing coil while the inductive sensing coil generates the magnetic field, and applying a second scaling factor to an imaginary component of the voltage.

21. The medium of claim 16, wherein the code, when executed, further causes the apparatus to maintain a fixed position of an inductive power transfer coil relative to the inductive sensing coil.

22. The medium of claim 16, wherein the relative motion between the inductive sensing coil and the object is induced via motion of the inductive sensing coil, wherein the motion of the sensing coil is substantially sinusoidal in at least one of 3 mutually orthogonal directions.

23. An apparatus for detecting an object, comprising:
    means for generating a magnetic field, the means for generating the magnetic field configured to have an electrical characteristic that is detectable when generating the magnetic field;
    means for inducing relative motion between the means for generating the magnetic field and the object while generating the magnetic field;
    means for detecting a change in the electrical characteristic; and
    means for determining a presence of the object based on the change in the electrical characteristic correlating with the relative motion between the means for generating the magnetic field and the object.

24. The apparatus of claim 23, wherein the electrical characteristic comprises one or more of an equivalent resistance, an equivalent inductance, an equivalent impedance, and an impulse response of the means for generating a magnetic field.

25. The apparatus of claim 23, wherein the object comprises one or more of a metallic object, a metallic film and a metallic foil.

26. The apparatus of claim 23, wherein the means for generating the magnetic field comprises a plurality of inductive sensing coils, the apparatus further comprising means for multiplexing measurements of a plurality of changes in the electrical characteristic of the plurality of inductive sensing coils.

27. The apparatus of claim 23, further comprising:
    means for applying a first scaling factor to a real component of a voltage induced across the means for generating the magnetic field; and
    means for applying a second scaling factor to an imaginary component of the voltage to reduce sensitivity to detection of dielectric objects.

28. The apparatus of claim 23, further comprising an inductive power transfer coil having a fixed position relative to the means for generating the magnetic field.

29. The apparatus of claim 23, further comprising means for detecting the change in the electrical characteristic in the time domain.

30. The apparatus of claim 23, wherein the relative motion of the means for generating the magnetic field and the object is induced via motion of the means for generating the magnetic field, wherein the motion of the means for generating the magnetic field is substantially sinusoidal in at least one of 3 mutually orthogonal directions.

* * * * *